United States Patent [19]

Braun

[11] Patent Number: 5,025,618
[45] Date of Patent: Jun. 25, 1991

[54] FUEL TANK WITH STEPPED INTERIOR GAUGE

[75] Inventor: Stephen A. Braun, Horicon, Wis.
[73] Assignee: Deere & Company, Moline, Ill.
[21] Appl. No.: 516,625
[22] Filed: Apr. 30, 1990
[51] Int. Cl.⁵ .............................................. A01D 75/00
[52] U.S. Cl. .................................. 56/16.7; 56/DIG. 9; D15/17
[58] Field of Search ....................... 56/16.7, 1, DIG. 9, 56/DIG. 18, 17.5; 280/830, 833; 220/5 R, 905; 206/562, 564, 459; 215/365, 366; D15/17

[56] References Cited

U.S. PATENT DOCUMENTS

| | | | |
|---|---|---|---|
| 1,172,627 | 2/1916 | Nitardy et al. | 215/365 |
| 1,638,199 | 8/1927 | Hermes | 215/366 |
| 4,135,724 | 1/1979 | Larsen | 280/5 R |
| 4,258,539 | 3/1981 | Pearce et al. | 56/320.2 |
| 4,558,558 | 12/1985 | Horner, Jr. et al. | 56/11.3 |

OTHER PUBLICATIONS

Fuel Gauge Illustration, Deere & Company's 300 Series Tractors, 1983.
Lawn-Boy Brochure, pp. 1-11, "American's Long Running Tradition", (undated).
Cub Cadet Brochure, pp. 1-12, "Home Maintenance--Power Mowers, Tillers, & Chore Performers", (undated).

*Primary Examiner*—Terry Lee Melius

[57] ABSTRACT

A fuel tank usable with lawn mowers, snowblowers and similar small powered equipment is provided. The polyethylene tank is rotationally molded and includes several stepped ledges inside which serve to indicate the proportional volume of fuel remaining in the tank. A wide mouthed fuel inlet is provided to permit visual observation of the fuel level inside the opaque tank in relation to the stepped ledges.

4 Claims, 2 Drawing Sheets

FUEL TANK WITH STEPPED INTERIOR GAUGE

FIELD OF THE INVENTION

The present invention relates to lawn mowers and more particularly to a fuel tank usable on lawn mowers, snowblowers and similar equipment.

BACKGROUND OF THE INVENTION

Lawn and garden equipment, snowblowers and similar powered equipment are commonly equipped with a fuel tank mounted on the chassis of the vehicle. The fuel tanks vary with respect to the materials they are composed of and include metal, polyethylene and fiberglass. Some polyethylene fuel tanks are produced through a rotational molding process which permits them to be uniquely shaped to conform to a particular chassis mounting structure and/or space constraining restrictions.

For providing an operator with an indication of the amount of fuel left in such tanks, various types of gauges, floats and dip sticks have been provided. Often these indicators fail as they are subjected to rough usage, dust, moisture and other abuses. To replace or repair them can be expensive. Similarly, many such gauges become inaccurate and fail to properly indicate the amount of fuel left in the tank.

SUMMARY OF THE INVENTION

The present invention provides a rotationally molded polyethylene fuel tank with a series of stepped ledges in the fuel tank. The ledges are visible through a wide mouthed fuel inlet which is positioned in the top portion of the tank. The inlet serves a dual purpose, that of permitting quick and easy fueling of the tank, as well as enabling the operator to peer into an opaque tank and observe the amount of fuel remaining in the tank. The ledges are formed to be visible through the inlet and to indicate whether the tank is three-quarters, one-half or one-quarter full. Because the ledges form part of the tank structure, they will serve as fuel level indicators as long as the tank's integrity exists.

Further provided in the sides of the rotationally-molded tank are channels for mounting the tank between the handles of an upright walk-behind-type lawn mower. A support shoulder is formed along the rear upper edge of the tank for mounting the tank on a bracket carried between the handles of the mower.

DESCRIPTION OF THE PREFERRED EMBODIMENT

Figure 1:
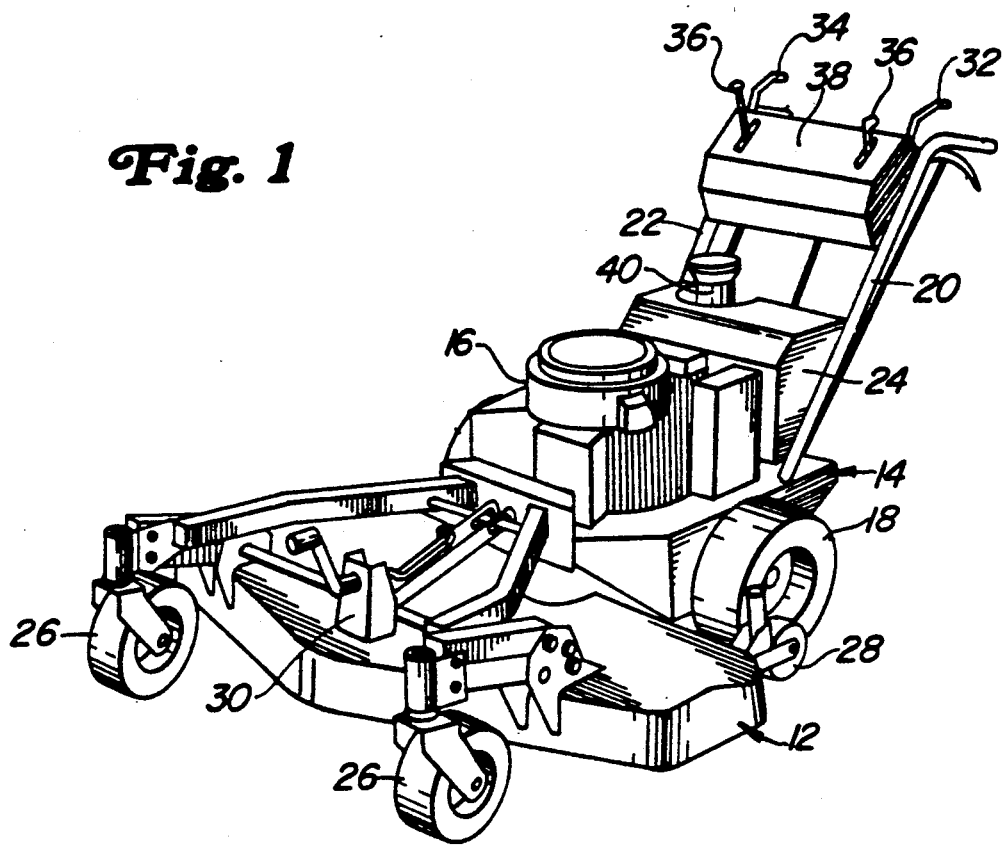
FIG. 1 shows a front perspective view of a walk-behind lawn mower utilizing the present fuel tank invention.

Looking now to FIG. 1, there is illustrated a walk-behind lawn mower 10 utilizing the present fuel tank invention. The mower 10 includes a mower deck 12, a wheeled chassis 14, an engine 16, a pair of drive wheels 18, a pair of upwardly extending handles 20 and 22, and the fuel tank 24 mounted between the handles 20 and 22 and supported on the chassis 14. The mower deck 12 is conventional and includes front gauge wheels 26, rear wheels 28, and an adjustment mechanism 30 for varying the height of the deck 12 with respect to the chassis 14. The chassis 14 carries the engine 16 and has left and right handles 20 and 22 extending upwardly and rearwardly therefrom. The handles 20 and 22 are provided with left and right drive wheel controls 32 and 34 at their upper portions. Additional controls 36 as appropriate are provided for in the module 36 carried at the upper end of the handles 20 and 22.

The fuel tank 24 is mounted between the handles 20 and 22 and includes the upwardly extending fuel inlet opening 40. The tank 24 is mounted to be convenient for filling and visual observation thereinto.

Figure 2:
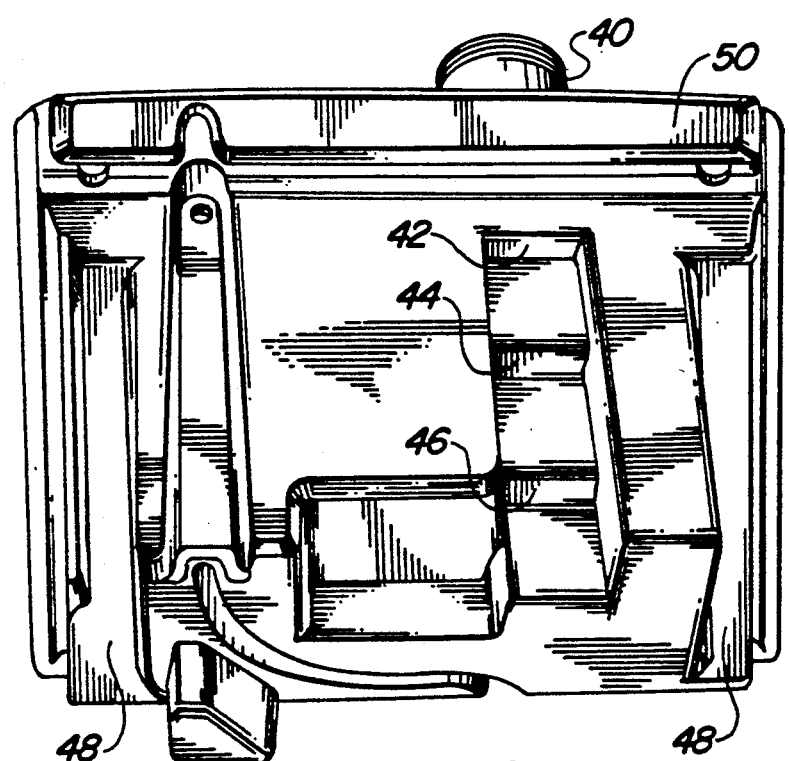
FIG. 2 shows a rear view of the fuel tank illustrating the fuel gauge ledges formed into the body of the tank.
Figure 3:
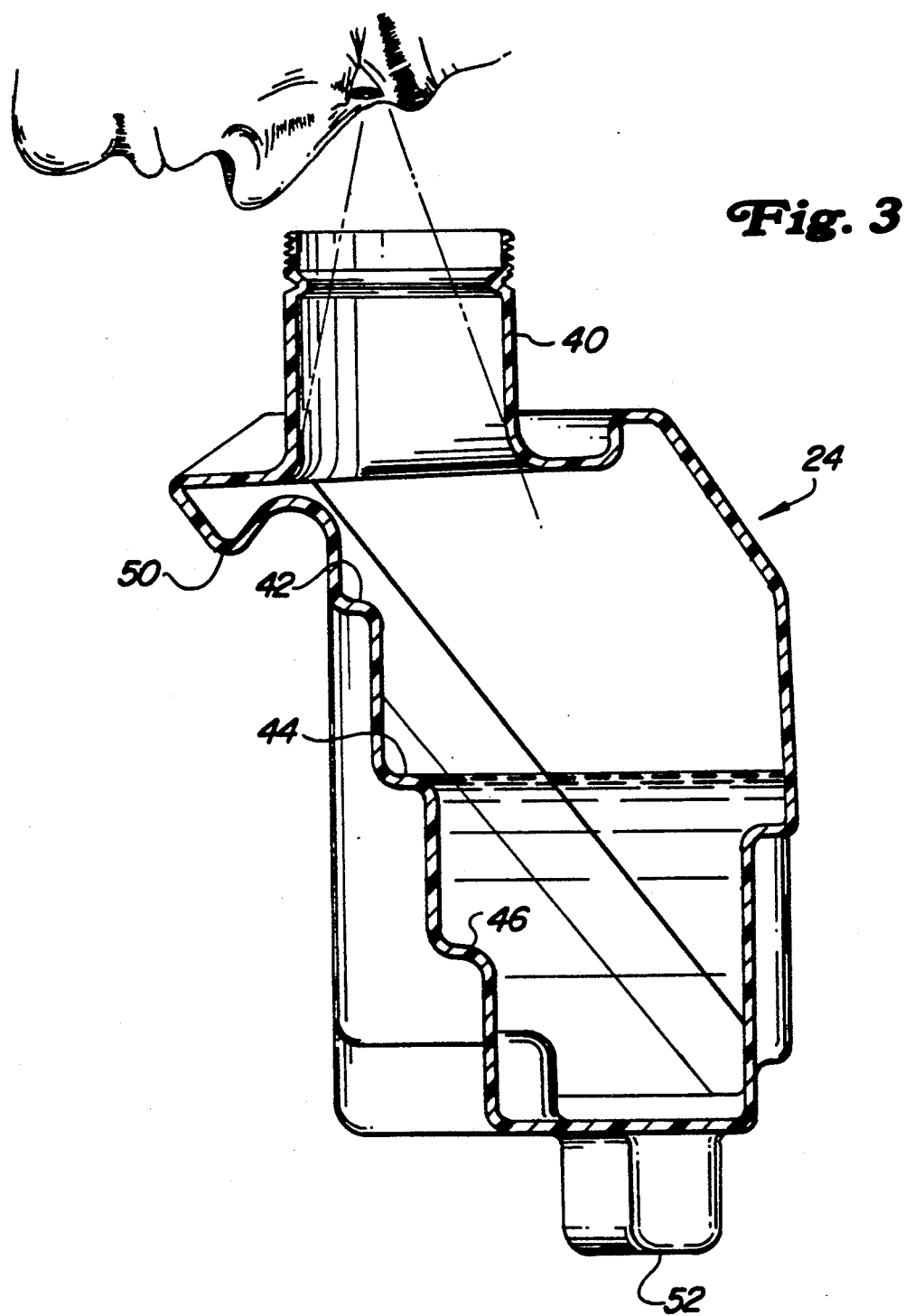
FIG. 3 shows a cross section of the fuel tank and the gauge ledges provided therein.

FIG. 2 illustrates a rear view of the rotationally molded fuel tank 24 with three ledges or shelves 42, 44 and 46 molded therein. The upper shelf 42, as also illustrated in FIG. 3, provides an indication of the three-quarter full level of the tank 24 in the preferred embodiment. The second step or ledge 44 provides an indication of the one-half fuel level and the third ledge 46 indicates the quarter full fuel level.

Looking again to FIG. 2, it is seen that there is provided on each side of the tank 24 a trough 48 compatibly shaped with the handles 20 and 22 for mounting thereon. At the top portion of the tank 24 and at the rear thereof, as better seen in FIG. 3, is provided a shoulder 50 shaped to seat upon a bracket (not shown) which is carried between the handles 20 and 22. The shoulder 50 seats on the bracket and serves to support the weight of the tank 24. Further supporting the fuel tank 24 is the chassis 14. A generally triangularly-shaped neck 52 is formed in the tank 24 at its bottom portion (see FIG. 2). The neck 52 seats into a recess (not shown) provided on the chassis 14 of the mower 10. The present invention provides the operator with a wide mouthed fuel inlet 40 which, when the cap is removed, permits him to view inside the tank 24 and, with the usual outdoor lighting available, enables him to visually observe the level of the fuel in the tank 24 and compare it to a ledge or shelf fuel level indicator.

With the present invention, there is provided a simple, economically manufacturable and reliable fuel tank with fuel gauge levels that permit the operator to quickly and easily estimate the fuel remaining in the tank.

I claim:

1. A fuel tank usable with a mobile vehicle having an engine thereon, said fuel tank having a wide mouthed and upwardly opening fuel inlet, the body of the tank being formed of opaque material and including inside thereof a plurality of stepped surfaces positioned beneath and visible through the wide mouthed fuel inlet, the stepped surfaces being vertically offset from the inlet and one another and positioned so as to indicate proportionate volumes of fuel in the tank when the surface of the fuel is generally even with a stepped surface.

2. The invention disclosed in claim 1, wherein upper, middle and lower vertically stepped surfaces are provided for indicating approximate fuel tank volumes of three-quarters, one-half and one-quarter as the surface of the fuel is respectively proximate the upper, middle and lower surfaces.

3. The invention disclosed in claim 1, wherein the fuel tank is carried between two upwardly extending handles of a walk-behind lawn mower and the fuel inlet is positioned rearwardly of and above the engine carried on the mower.

4. The invention disclosed in claim 3, wherein the fuel tank includes an upper lip portion extending across its width, said portion being seatable upon a cross support carried between the mower handles.

* * * * *